March 10, 1959     B. WEIL     2,877,048
AMBULANCE CART WITH HAND RELEASE
Filed June 17, 1957
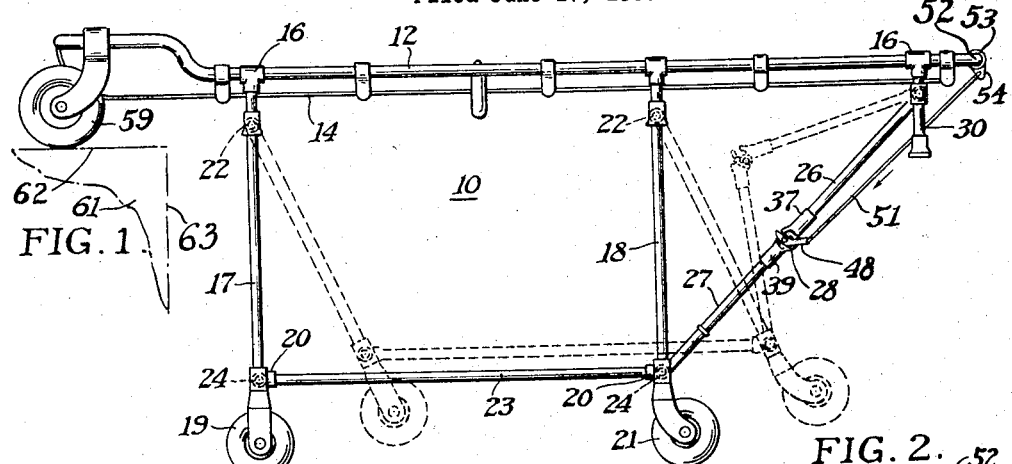
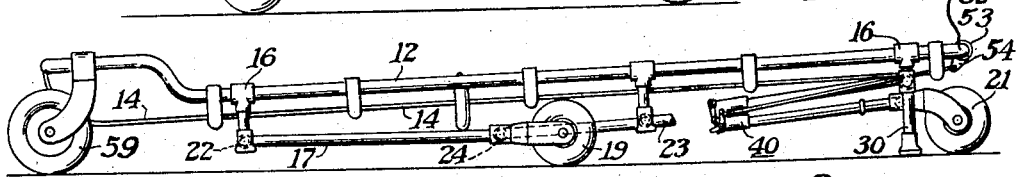
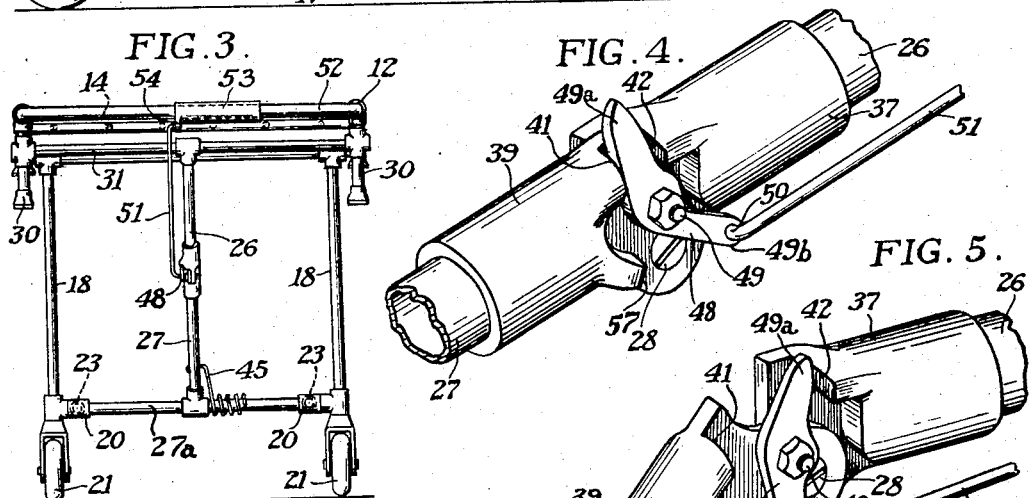
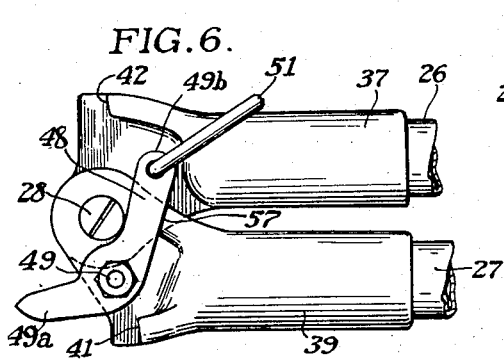
INVENTOR.
BURT WEIL
BY Jugelter & Jugelter
ATTORNEYS United States Patent Office 2,877,048
Patented Mar. 10, 1959

2,877,048

AMBULANCE CART WITH HAND RELEASE

Burt Weil, Cincinnati, Ohio

Application June 17, 1957, Serial No. 666,182

5 Claims. (Cl. 296—20)

This invention relates to an ambulance cart or stretcher, or the like, having a collapsible framework or undercarriage.

In a co-pending United States patent application Serial No. 609,722 filed September 13, 1956, now Patent No. 2,841,438, an improved ambulance cart is disclosed by means of which a single attendant, such as the operator of an ambulance vehicle, can readily transport a body from a bed to the ambulance and load the same into the ambulance in a simple and convenient manner, without undue exertion. The apparatus there disclosed comprises a stretcher frame having an undercarriage which is normally locked in erect position for wheeled movement of the vehicle over the ground or floor but which is readily collapsible rearwardly to a position underneath the frame. The stretcher at its forward end has rotatable wheel means adapted for engagement with the floor of the ambulance as the cart approaches the rear of the vehicle whereby the undercarriage, when released, is swung to its retracted position underneath the stretcher frame as the cart is pushed forwardly into the ambulance. To hold the undercarriage against collapse during normal wheeling movement of the cart, the structure shown in the aforesaid patent application comprises a toggle-type strut interconnecting the stretcher frame and the undercarriage. To collapse the strut and thereby release the undercarriage, the operator, while sustaining the weight of the body at the rear end of the carriage, raises his knee to exert a force at the hinge of the toggle which causes it to "break" or collapse at the hinge. In this momentary period the entire weight load is carried by the operator on one leg and, if the weight of the body on the stretcher is very great, as is sometimes the case, there is a possibility the operator may lose his balance.

A principal objective of this invention has been to provide a one-man cart generally of the type shown in the aforesaid patent application but so constructed and arranged that release of the undercarriage readily may be effected while the operator has both feet on the ground and both hands on the handle bar and, therefore, is not subjected to any degree of imbalance while releasing the undercarriage or at any other time.

A further object of this invention is to provide a cart of this type having an undercarriage locking arrangement which holds the undercarriage in elevated position which is provided with a release which can be actuated by one hand of an operator while the same hand is being used to support the end of the cart remote from the aforementioned wheel means, so that the lock can be released as the cart is advanced into the vehicle and the legs of the undercarriage can be swung to a position against the underside of the cart as the cart is advanced into the vehicle.

The above and other objects and features of the invention will in part be apparent and will in part be obvious to those skilled in the art to which this invention pertains, from the following detailed description, and the drawing, in which:

Figure 1 is a view in side elevation showing a cart constructed in accordance with an embodiment of this invention, a fragmentary portion of a vehicle being shown in dot-dash lines in association therewith, the undercarriage of the cart being shown in dotted lines in partly collapsed position;

Fig. 2 is a view in side elevation of the cart in collapsed position, part of the framework being broken away to reveal structural details;

Fig. 3 is a view in rear elevation of the cart in elevated position;

Fig. 4 is an enlarged, fragmentary, perspective view showing hinge members of the locking arrangement of the cart in raised position;

Fig. 5 is an enlarged, fragmentary, perspective view showing the hinge members in partly released position; and Fig. 6 is an enlarged view in side elevation of the hinge members in collapsed position.

In the following detailed description, and the drawing, like reference characters indicate like parts.

In the drawing is shown a cart 10 constructed in accordance with an embodiment of this invention. The cart 10 includes an elongated generally rectangular frame 12 on which is supported a grid 14 which supports bedding and the like (not shown).

The frame 12 may be made of tubular members such as pipe or the like. T-fittings 16 are mounted on the framework 12 to support an undercarriage which includes front legs 17 and rear legs 18. Wheels 19 are mounted on the lower ends of the front legs 17, and casters 21 are mounted on the lower ends of the rear legs 18. The legs 17 and 18 swing upon pivots 22 as indicated in Figs. 1 and 2 from the upright position shown in Fig. 1 through an intermediate position shown in dotted lines in Fig. 1 to a collapsed position shown in Fig. 2. Tie rods 23 link the front and rear legs so that the front and rear legs swing together as the framework is raised or collapsed. The tie rods 23 are pivotally connected to the front and rear legs at pivot connections 24.

The undercarriage is held in raised position by a pair of toggle links or struts indicated at 26 and 27. The lower end of the strut 27 is pivotally mounted on a cross bar 27a, which links the rear legs 18. The upper end of the strut 26 is pivotally mounted on a cross member 31 (see Fig. 3). The adjacent ends of the struts 26 and 27 are pivotally connected at a pivot 28 which is spaced from the axis of the strut members 26 and 27.

When the legs are in collapsed position, the rear end of the cart can rest on stub legs 30, as indicated in Fig. 2. When the cart is in raised position, the struts 26 and 27 are substantially aligned and hold the cart in raised position. When the cart is in raised position, hinge members 37 and 39 are substantially aligned. In this position a shoulder 41 on the member 39 and a shoulder 42 on the member 37 (see Figs. 4-6 inclusive) prevent swinging of the struts beyond substantially aligned position. A spring 45 urges the struts to the substantially aligned position shown in Fig. 1.

Release is effected by operation of a crank 48. The crank 48 is mounted on a pivot 49 which is substantially on the axis of the struts when the struts are in alignment. The pivot 49 is mounted on the member 39. When the toggle struts are aligned, the pivot 49 of the crank 48 is between the hinge pivot 28 and the abutting faces of the shoulders 41 and 42. One end 49a of the crank 48 is engageable with the shoulder 42. The other end 49b of the crank is pivotally connected to a lower end 50 of an actuating strut or rod 51. The rod 51 extends to adjacent a rear cross member 52 of the frame 12. A sleeve 53 is pivotally mounted on the cross member 52.

The sleeve 53 carries a crank arm 54 which is pivotally attached to the upper end of the rod 51. Turning of the sleeve 53 upon the cross member 52 causes the crank 48 to swing in a clockwise direction, as shown in Figs. 4 and 5, to cause the crank to urge the struts to the toggle released position shown in Fig. 5 and in Fig. 1 in dotted lines. An abutment 57 on the hinge member 39 limits swinging of the crank.

As shown in Figs. 1 and 2, the frame 12 carries two auxiliary wheels 59 (only one of which is shown) at the forward end thereof, i. e., at the end remote from the latching mechanism. The wheels 59 are mounted on opposite sides of the frame 12 and extend below the bed of the cart. As shown in Fig. 1, when the cart is in elevated position, the auxiliary wheels 59 can be advanced into the rear end of a vehicle 61, such as a hearse, ambulance, or the like, having a floor 62, on which the wheels 59 can ride. When the cart is to be advanced into the vehicle, the forward end of the cart and the wheels 59 are pushed into the vehicle to the position shown in Fig. 1. Then an operator at the other end of the cart can support the cart by holding and raising the other end. The operator supports the cross member 52 with one hand grasping the sleeve 53. When the cart is to be advanced into the vehicle, the operator twists the sleeve 53 in a clockwise direction as shown in Fig. 1 which through the linkage to the toggle latch breaks or releases the toggle latch. Then, as the cart is advanced into the vehicle, the front legs of the vehicle engage the rear end 63 thereof and the legs and undercarriage swing up to the Fig. 2 position, as the cart is advanced into the vehicle. When the cart is inside the vehicle, the cart may rest on the auxiliary wheels 59 and the stub legs 30.

When the cart is to be removed from the vehicle, the operator grasps the cross member 52 and draws the rear end of the cart out of the vehicle. As the cart is advanced out of the vehicle, the legs of the undercarriage fall through the dotted line position of Fig. 1 to the raised position shown in full lines in Fig. 1. When the framework is in this position, the spring 45 holds the toggle struts in substantially aligned position so that the framework is held in elevated position.

The cart can be handled by a single operator without need for assistance in raising or lowering the undercarriage of the cart.

The cart illustrated in the drawing and described above is subject to structural modification without departing from the spirit and scope of the appended claims.

Having described my invention, what I claim as new and desire to secure by Letters Patent is:

1. A cart comprising an elongated bed, leg means swingably mounted on the underside of said bed, wheel means mounted on the free end of the leg means and swingable with the leg means between an extended position in which the bed is supported by the wheel means at an elevated height, and a retracted position in which the leg means and the wheel means are adjacent the underside of the bed, auxiliary wheel means mounted below the bed at one end thereof, and a toggle lock extending from the bed adjacent the end remote from the auxiliary wheel to the leg means, said toggle lock comprising toggle struts pivotally connected to the bed and to the leg means, a hinge between the toggle struts, abutment members on the toggle struts spaced from the pivot of the hinge, the abutment members being engageable when the toggle struts are substantially in alignment to limit swinging of the toggle struts in one direction, means for urging the toggle struts to swing in said direction, a toggle releasing member pivotally mounted on one of the toggle struts and engageable with the other toggle strut for urging the toggle struts in the opposite direction, and operator controlled means for swinging the toggle releasing member in toggle releasing direction to release the toggle.

2. A cart comprising an elongated bed, leg means swingably mounted on the underside of said bed, wheel means mounted on the free end of the leg means and swingable with the leg means between and extended position in which the bed is supported by the wheel means at an elevated height, and a retracted position in which the leg means and the wheel means are adjacent the underside of the bed, auxiliary wheel means mounted below the bed at one end thereof, and a toggle lock extending from the bed adjacent the end remote from the auxiliary wheel to the leg means, said toggle lock comprising toggle struts pivotally connected to the bed and to the leg means, a hinge between the toggle struts, abutment members on the toggle struts spaced from the pivot of the hinge, the abutment members being engageable when the toggle struts are substantially in alignment to limit swinging of the toggle struts in one direction, means for urging the toggle struts to swing in said direction, a toggle releasing crank member pivotally mounted on one of the toggle struts and engageable with the other toggle strut for urging the toggle struts in the opposite direction, the pivot of the crank member being between the hinge pivot and the abutment members when the toggle struts are in substantial alignment, and operator controlled means for swinging the toggle releasing member in toggle releasing direction to release the toggle.

3. A cart comprising a framework, an elongated bed supported on the framework, leg means swingably mounted on the underside of said framework, wheel means mounted on the free end of the leg means and swingable with the leg means between an extended position in which the bed is supported by the wheel means at an elevated height, and a retracted position in which the leg means and the wheel means are adjacent the underside of the bed, auxiliary wheel means mounted below the bed at one end thereof, and a toggle lock extending from the bed adjacent the end remote from the auxiliary wheel means to the leg means, said toggle lock comprising a pair of toggle struts pivotally connected to the framework and to the leg means, a hinge between the toggle struts, abutment members on the toggle struts spaced from the pivot of the hinge, the abutment members being engageable when the toggle struts are substantially in alignment to limit swinging of the toggle struts in one direction, means for urging the toggle struts to swing in said direction, a toggle releasing crank member pivotally mounted on one of the toggle struts and having an arm engageable with the other toggle strut for urging the toggle struts in the opposite direction, an actuating rod, means for pivotally connecting one end of the actuating rod to the toggle releasing crank, the actuating rod extending to adjacent the rear end of the cart, the framework of the cart including a transverse member at the rear end of the cart supportable by an operator, an operator controlled crank pivotally mounted on said transverse member and turnable by an operator while supporting the transverse member, and a crank arm on the operator controlled crank pivotally connected to the other end of the actuating rod, whereby turning of the operator controlled crank causes swinging of the toggle releasing crank member in toggle releasing direction to release the toggle.

4. A cart comprising a framework, an elongated bed supported on the framework, leg means swingably mounted on the underside of said framework, wheel means mounted on the free end of the leg means and swingable with the leg means between an extended position in which the bed is supported by the wheel means at an elevated height, and a retracted position in which the leg means and the wheel means are adjacent the underside of the bed, auxiliary wheel means mounted below the bed at one end thereof, and a toggle lock extending from the bed adjacent the end remote from the auxiliary wheel means to the leg means, said toggle lock comprising a pair of toggle struts pivotally connected to the framework and to the leg means, a hinge between the toggle struts, abutment members on the toggle struts spaced from the pivot of the hinge, the abutment members being engageable when the toggle struts are substantially in alignment to limit swinging of the toggle struts in one direction, means for urging the toggle struts to swing in said direction, a toggle releasing crank member pivotally mounted on one of the toggle struts and engageable with the other toggle strut for urging the toggle struts in the opposite direction, an actuating rod, means for pivotally connecting one end of the actuating rod to the toggle releasing crank, the actuating rod extending to adjacent the rear end of the cart, the framework of the cart including a transverse member at the rear end of the cart supportable by an operator, an operator controlled sleeve member pivotally mounted on said transverse member and turnable by an operator while supporting the rear end of the cart by means of the transverse member, and a crank arm on the sleeve pivotally connected to the other end of the actuating rod, whereby turning of the operator controlled sleeve causes swinging of the toggle releasing crank member in toggle releasing direction to release the toggle.

5. An ambulance cart comprising a stretcher frame having handle means at the rear end thereof, an undercarriage pivotally associated with said stretcher frame intermediate the ends of said frame, said undercarriage being pivotally movable in a rearward direction relative to said frame to a collapsed position underneath said frame and including forward and rearward sets of wheels for ground engagement when said undercarriage is erect, auxiliary wheels mounted substantially in the plane of said frame at the front end thereof, the auxiliary wheels being adapted to run on the floor of a vehicle to support the front end of a stretcher, releasable means for securely bracing said undercarriage against collapse when said undercarriage is erect, a hand grip actuator mounted at the rear of said frame on said handle means and operable by the hand of an operator while a grasp of said handle means for support of the rear end of the cart is maintained, and link means connecting said actuator to said releasable means to effect the release of said releasable means when said actuator is operated, whereby an operator stationed at the rear end of said stretcher with both feet firmly engaging the ground is enabled manually to release said releasable means while manually supporting the rear end of the frame, said undercarriage being engageable with the vehicle as the cart is advanced into the vehicle to pivot said undercarriage to a collapsed position bringing said undercarriage wheels to substantially the level of said auxiliary wheels.

References Cited in the file of this patent

UNITED STATES PATENTS

| | | |
|---|---|---|
| 1,924,223 | Weatherly | Aug. 29, 1933 |
| 2,005,716 | Kovats | June 18, 1935 |
| 2,747,919 | Ferneau | May 29, 1956 |
| 2,841,438 | Weil | July 1, 1958 |

FOREIGN PATENTS

| | | |
|---|---|---|
| 25,429 | Great Britain | of 1911 |
| 345,843 | Great Britain | Apr. 2, 1931 |
| 369,456 | Great Britain | Mar. 24, 1932 |